US007575034B2

(12) United States Patent
Kott et al.

(10) Patent No.: US 7,575,034 B2
(45) Date of Patent: Aug. 18, 2009

(54) LOCKING ASSEMBLY FOR A MANUFACTURED WOOD PRODUCTS PRESS

(75) Inventors: Norbert Kott, Ft. Langley (CA); Steven Rempel, Langley (CA)

(73) Assignee: Weyerhaeuser Company Ltd, Vancouver, BC (CA)

( * ) Notice: Subject to any disclaimer, the term of this patent is extended or adjusted under 35 U.S.C. 154(b) by 434 days.

(21) Appl. No.: 11/313,863

(22) Filed: Dec. 20, 2005

(65) Prior Publication Data

US 2007/0137795 A1 Jun. 21, 2007

(51) Int. Cl.
*B32B 37/00* (2006.01)

(52) U.S. Cl. ........................ 156/580; 100/219; 100/237

(58) Field of Classification Search ................. 156/580, 156/581, 583.1; 100/315, 316, 214, 219, 100/237, 269.07–269.11
See application file for complete search history.

(56) References Cited

U.S. PATENT DOCUMENTS

| | | | | |
|---|---|---|---|---|
| 3,586,093 | A * | 6/1971 | Young | 164/173 |
| 5,849,141 | A * | 12/1998 | Carlberg et al. | 156/556 |
| 6,692,614 | B2 * | 2/2004 | Wright | 156/583.4 |
| 2003/0168162 | A1 * | 9/2003 | Eile et al. | 156/289 |
| 2006/0082018 | A1 * | 4/2006 | Regev | 264/259 |

* cited by examiner

*Primary Examiner*—James Sells
(74) *Attorney, Agent, or Firm*—Weyerhaeuser IP Dept; Rachael Vaughn

(57) ABSTRACT

A lock assembly (100) is provided. Such a lock assembly includes a housing (120) and a pin assembly (129) disposed within the housing. The pin assembly is selectively actuatable between a locked position, where a pin (140) is displaced into engagement with first and second frame members (104 and 106), and an unlocked position.

17 Claims, 8 Drawing Sheets

LOCKING ASSEMBLY FOR A MANUFACTURED WOOD PRODUCTS PRESS

BACKGROUND

Orientated strand board ("OSB"), parallel strand board lumber, and other engineered wood products are formed by layering strands (flakes) of wood in specific orientations. Such manufactured wood products are typically manufactured in wide mats from cross-orientated layers of thin, rectangular wooden strips compressed and bonded together with wax and resin adhesives (95% wood, 5% wax and resin). These strips are created by refining wood onto mats, which are sifted and then orientated on a belt.

The mat is made by forming a bed of internal and external layers. The external layers are suitably aligned in a panel direction and the internal layers are typically randomly positioned. The number of layers placed is set by the required thickness of the finished panel. The mat is then placed in a thermal press system.

Recently developed press systems utilize a plurality of press units, each having opposed platens. The plurality of press units are disposed within spaced frame members and often operate under high loading conditions, such as about 1000 psi. Under certain operating conditions, such as power failure, the opposed platens "lock-up," where the platens are sometimes stuck in a compressed position. This prevents normal operation of the press.

To return the press back to its normal operating condition, the mat within the press must be removed from between the opposed platens. However, because of the high loading conditions under which the press units operate, it is often a labor intensive procedure to separate the platens to remove the mat. Thus, there exists a need for a lock assembly for a frame of a manufactured wood product press.

SUMMARY

A lock assembly for a manufactured wood products press is provided. Such a manufactured wood products press includes a plurality of frames, wherein at least one of the plurality of frames has first and second frame members. The lock assembly includes a housing and a pin assembly disposed within the housing. The pin assembly is selectively actuatable between a locked position, where a pin is displaced into engagement with the first and second frame members, and an unlocked position.

Another embodiment of a locking assembly for a manufactured wood products press is also provided. The locked assembly includes a housing, a pin assembly disposed within the housing, and a reciprocating assembly coupled to the pin assembly. The reciprocating assembly selectively drives a pin of the pin assembly between a locked position, where the pin member is deployed into locking engagement with portions of the first and second frame members, and an unlocked position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosure will become better understood by reference to the following detailed description, when taken in conjunction with the accompanying drawings, wherein.

DETAILED DESCRIPTION

Figure 1:
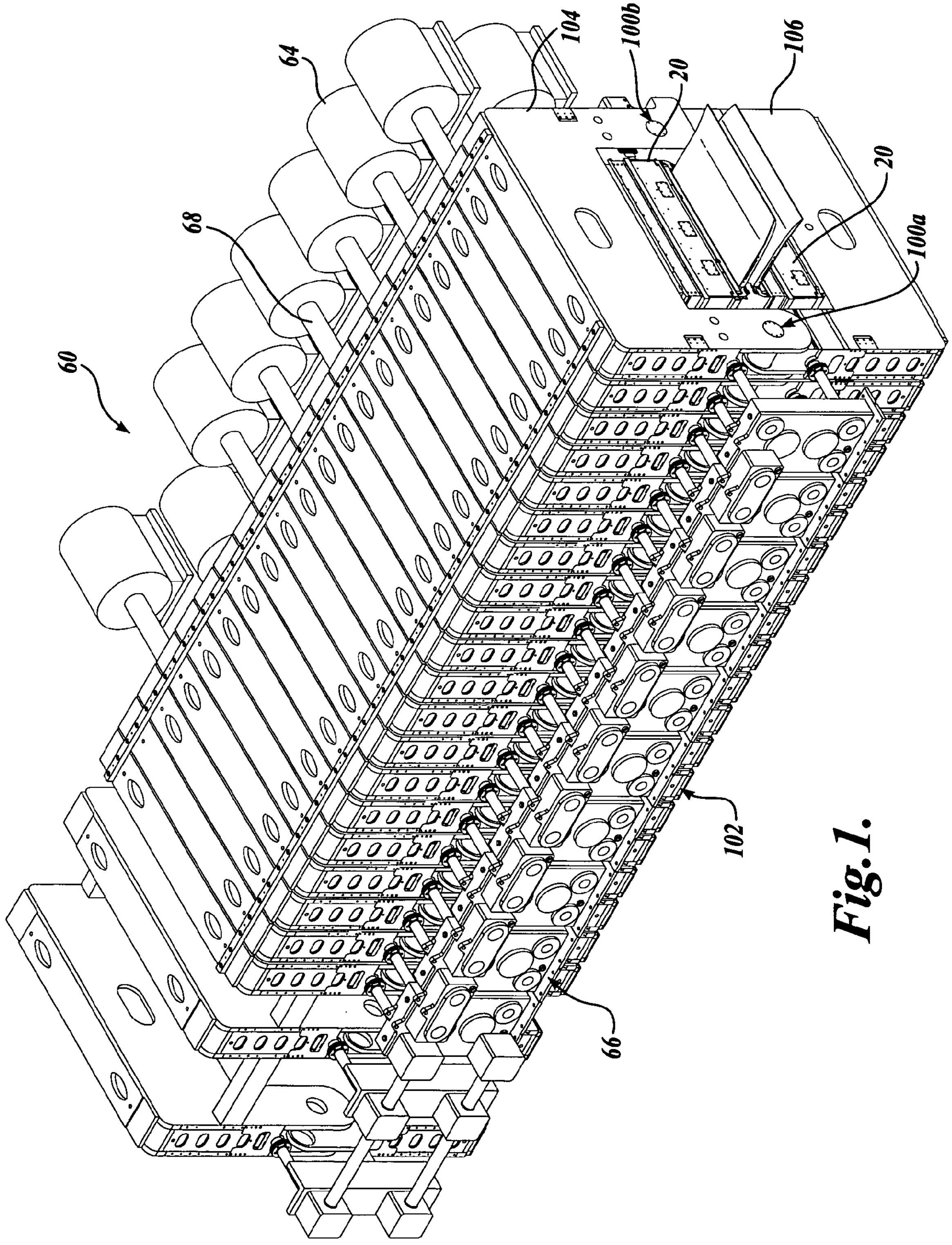
FIG. 1 is an isometric view of a manufactured wood products press having a lock assembly constructed in accordance with one embodiment of the present disclosure.

FIG. 1 illustrates a lock assembly 100 constructed in accordance with one embodiment of the present disclosure. The lock assembly 100 is shown as it would be used with a manufactured wood products press 60. Note that the manufactured wood products press 60 is suitably a press used in producing manufactured wood products, such as OSB. One such press is described in a co-pending U.S. patent application Ser. No. 11/236,925, filed Sep. 28, 2005, entitled MANUFACTURED WOOD PRODUCT PRESS, and assigned to Weyerhaeuser Company of Federal Way, Wash., the disclosure of which is hereby expressly incorporated by reference.

The manufactured wood products press 60 includes a press unit 20, a frame 102, and drive motors 64. In one embodiment, the manufactured wood products press 60 suitably includes two press units 20 disposed within the frame 102 in an opposed manner. In the illustrated embodiment, there are a plurality of press units 20 disposed within the manufactured wood products press 60, such that a plurality of opposed press units 20 are positioned along a length of the manufactured wood products press 60. The plurality of press units 20 are coupled to and driven at least in part by the plurality of combination timing assembly and linking assemblies 66.

As positioned within the frame 62, each press unit 20 counteracts the other during operation of the manufactured wood products press 60 to produce a wide variety of manufactured wood products under large operational loads. The production of such manufactured wood products is well-known in the art and is not detailed for conciseness.

Individual press units 20 are actuated by rotating crank shafts 68 that are driven by the drive motors 64. The press units 20 are operated in a coordinated manner, e.g., such that the drive shafts are rotationally in phase and are partially controlled by the gear box 66.

Although two press units 20 are illustrated, it should be apparent that the appended claims are not intended to be so limited. As a non-limiting example, the manufactured wood products press 60 may include only one press unit 20 positioned to be actuated against a fixed, opposing surface. Thus, manufactured wood products presses 60 having more or less press units 20 are also within the scope of the present disclosure.

Figure 2:
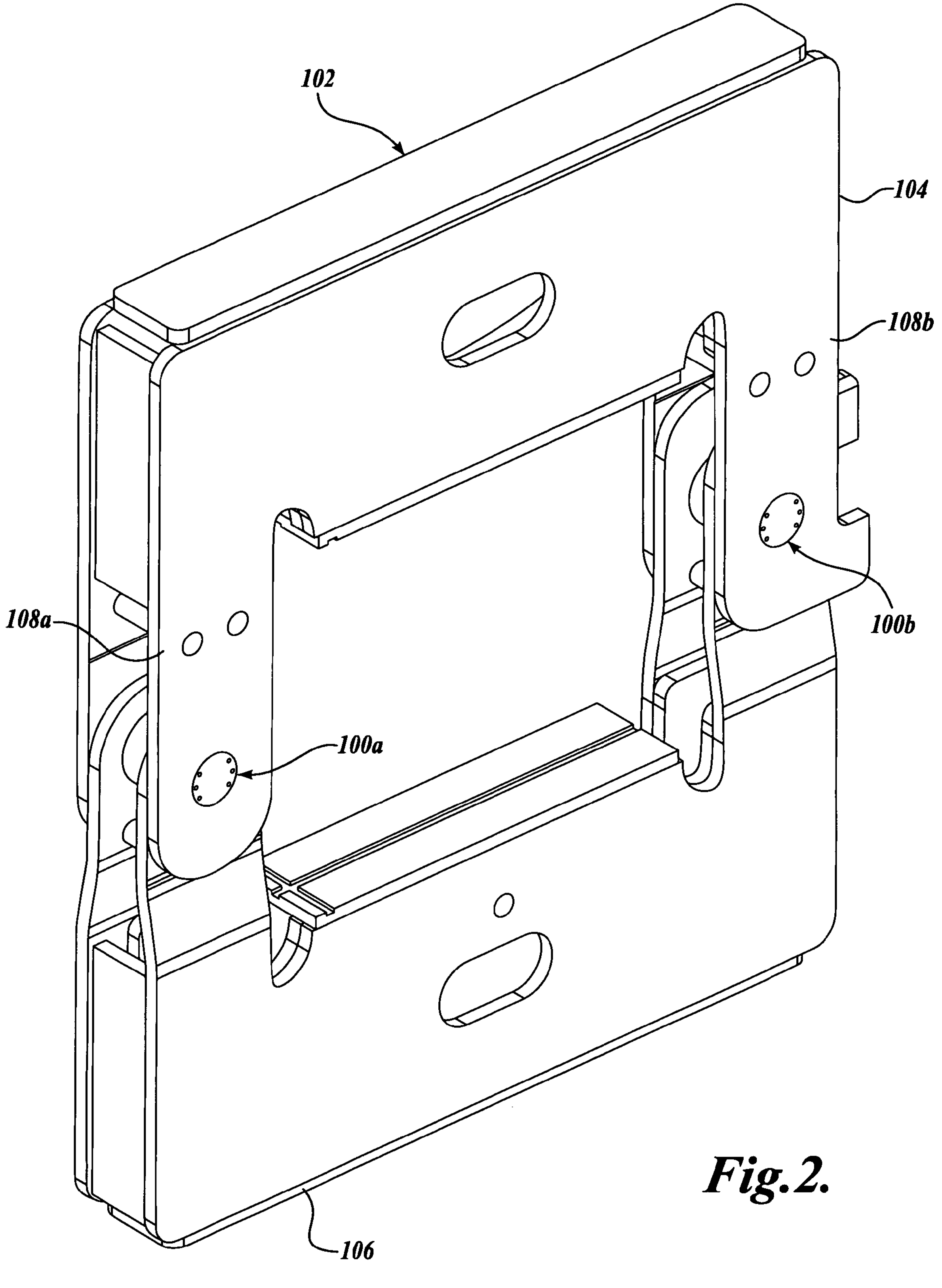
FIG. 2 is an isometric view of a frame for the manufactured wood products press of FIG. 1, showing the lock assembly in a locked position connecting upper and lower frame members and portions of the manufactured wood products press removed for clarity.

The manufactured wood products press 60 includes a plurality of frames 102. As may be best seen by referring to FIG. 2, each frame 102 including an upper frame member 104 and a lower frame member 106. Although directional terms, such as "upper," "lower," "inner," "outer," etc., may be used throughout the present disclosure, it should be apparent that the scope is not intended to be so limited. Instead, such directional terms are used in reference to the illustrations only and are not intended to be limiting.

The upper and lower frame members 104 and 106 are substantially identically configured as U-shaped members formed from a high strength material, such as steel. Each of the upper and lower frame members 104 and 106 include a pair of leg portions 108*a* and 108*b*. The leg portions 108*a* and 108*b* extend substantially normally from the ends of a spine portion. The ends of the leg portions 108*a* and 108*b* form a yoke.

Corresponding leg portions 108 of the upper frame member 104 and lower frame member 106 are sized and configured to be coupled together in overlapping relationship. In one embodiment, the first and second leg portions of the lower frame member 106 are sized to be received within and between the corresponding leg portions 108*a* and 108*b* of the upper frame portion 104.

First and second lock assemblies 100*a* and 100*b* are received within corresponding bores (not shown) in the first and second leg portions 108*a* and 108*b* of the upper and lower frame members 104 and 106. The first and second lock assemblies 100*a* and 100*b* are substantially identically configured and, therefore, only one lock assembly will be described in greater detail. However, it should be apparent that the description of one lock assembly is applicable to all lock assemblies of the present disclosure.

Figure 3:
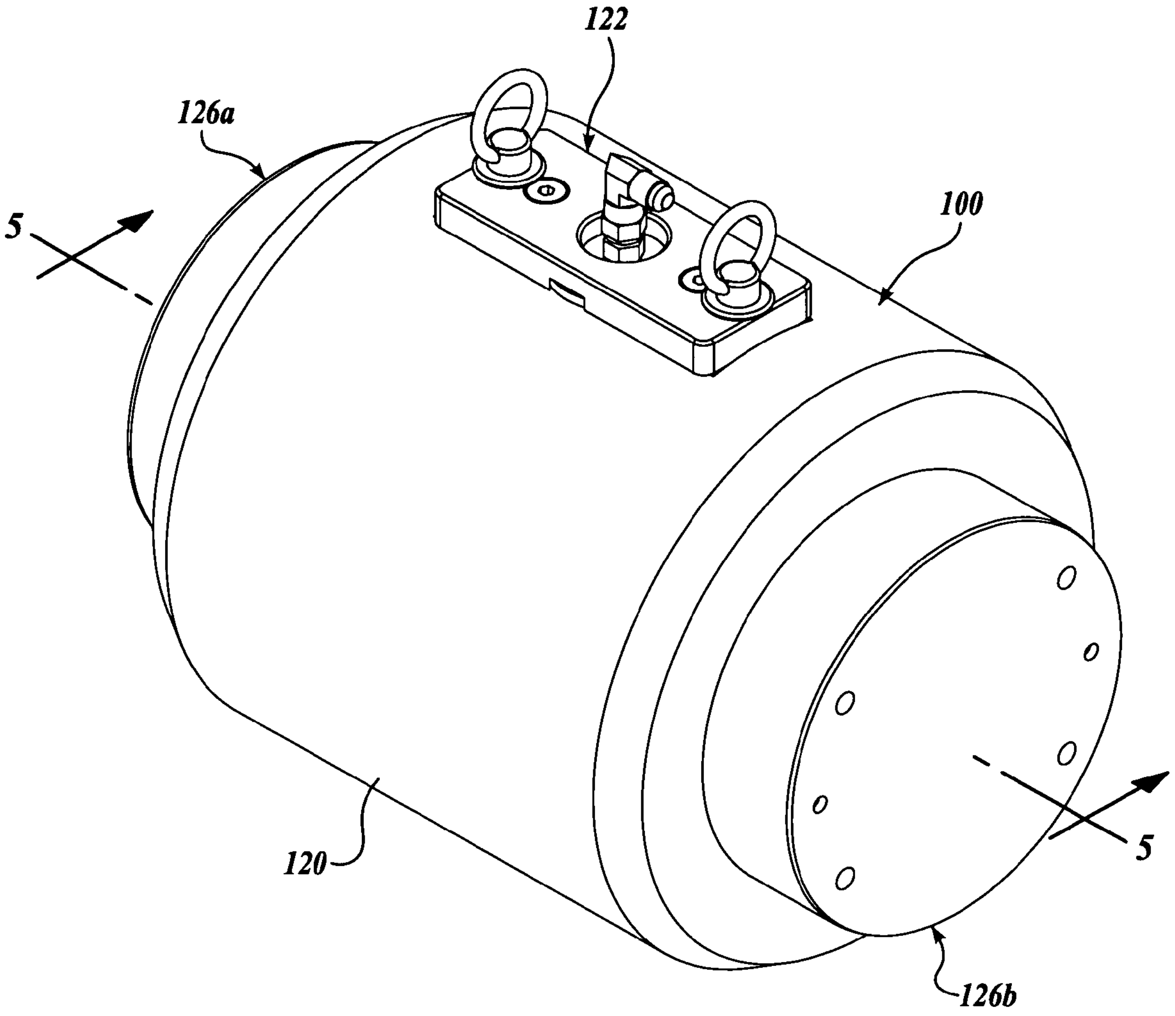
FIG. 3 is an isometric view of a lock assembly constructed in accordance with one embodiment of the present disclosure.
Figure 4:
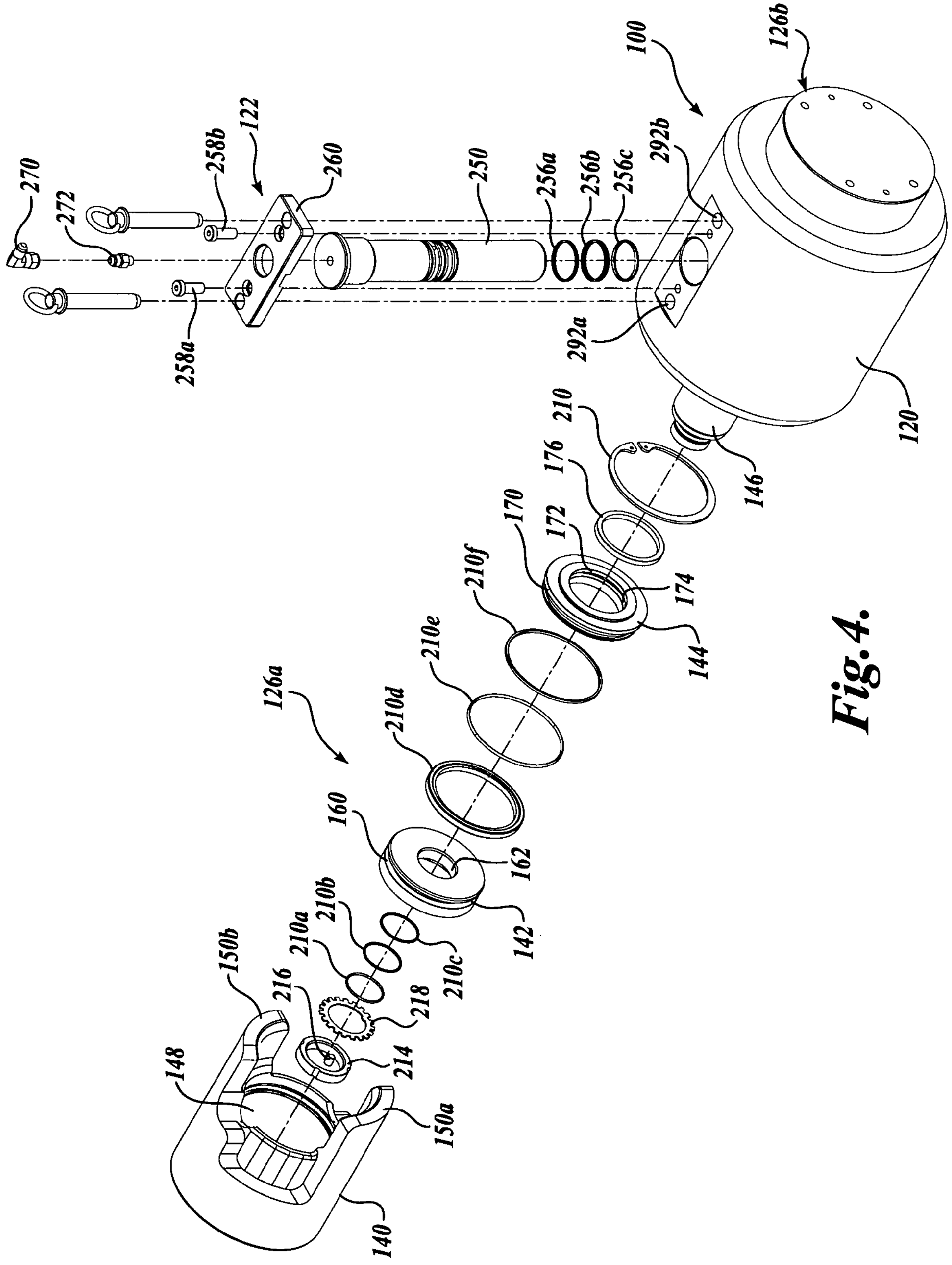
FIG. 4 is an exploded isometric view of the lock assembly of FIG. 3 and showing various internal components of the lock assembly.

As may be best seen by referring to FIGS. 3 and 4, the lock assembly 100 includes a housing 120, an extension assembly 122, a retraction assembly 124, and first and second pin assemblies 126*a* and 126*b*. As the first and second pin assemblies 126*a* and 126*b* are substantially identically designed and configured, as well as operationally substantially the same, only one pin assembly will be described in greater detail. However, the description of one pin assembly set forth below applies to the other pin assembly.

The housing 120 is suitably a cylindrical housing made of a high strength material, such as steel. The first and second pin assemblies 126*a* and 126*b* are mounted within the housing 120 for reciprocating movement between locked and unlocked positions, as is described in greater detail below. As may be best seen by referring to FIG. 4, the pin assembly 126*a* includes a pin 140, a piston 142, and an end cap 144, all sized and configured to be coupled to a pin connection shaft 146.

The pin 140 is suitably configured as a cylindrical member made of high strength material, such as steel, and includes a cavity 148 and first and second anchor portions 150*a* and 150*b*. The cavity 148 of the pin 140 is sized to receive the piston 142 and end cap 144 therein. The first and second anchor portions 150*a* and 150*b* are sized and configured to fit within the housing 120. The first and second anchor portions 150*a* and 150*b* act to distribute shear load associated with the pin assembly when the pin 140 is deployed in the locked position, wherein the pin 140 is extending within the first and second leg portions 108*a* and 108*b* of the upper and lower frame members 104 and 106.

Specifically, when the upper and lower frame members 104 and 106 are coupled, the respective leg portions 108*a* and 108*b* are nested together in an overlapping relationship. When the lock assemblies 100 are in the locked position, the pin 140 extends between the leg portions 108*a* and 108*b* in locking engagement to place the pin housing in shear. The corresponding anchor portions 150*a* and 150*b* of the pin 140 are sized and configured to extend into the housing 120. As such, the first and second anchor portions 150*a* and 150*b* distribute shear load associated with the pin 140 being in locking engagement with the upper and lower frame members 104 and 106.

Still referring to FIGS. 3 and 4, the piston 142 is a substantially circular shaped member and includes a sealing groove 160 formed in the perimeter of the piston 142. The piston 142 includes a centrally located mounting bore 162 sized and configured to be received on one end of the pin connection shaft 146.

The end cap 144 is also configured as an annular member and includes a sealing groove 170 formed in its perimeter. The end cap 144 also includes a mounting bore 172 sized and configured to fit on an outside diameter of the pin connection shaft 146, as described below. The mounting bore 172 also includes an interior sealing groove 174 sized to receive a well-known ring seal 176.

Figure 5:
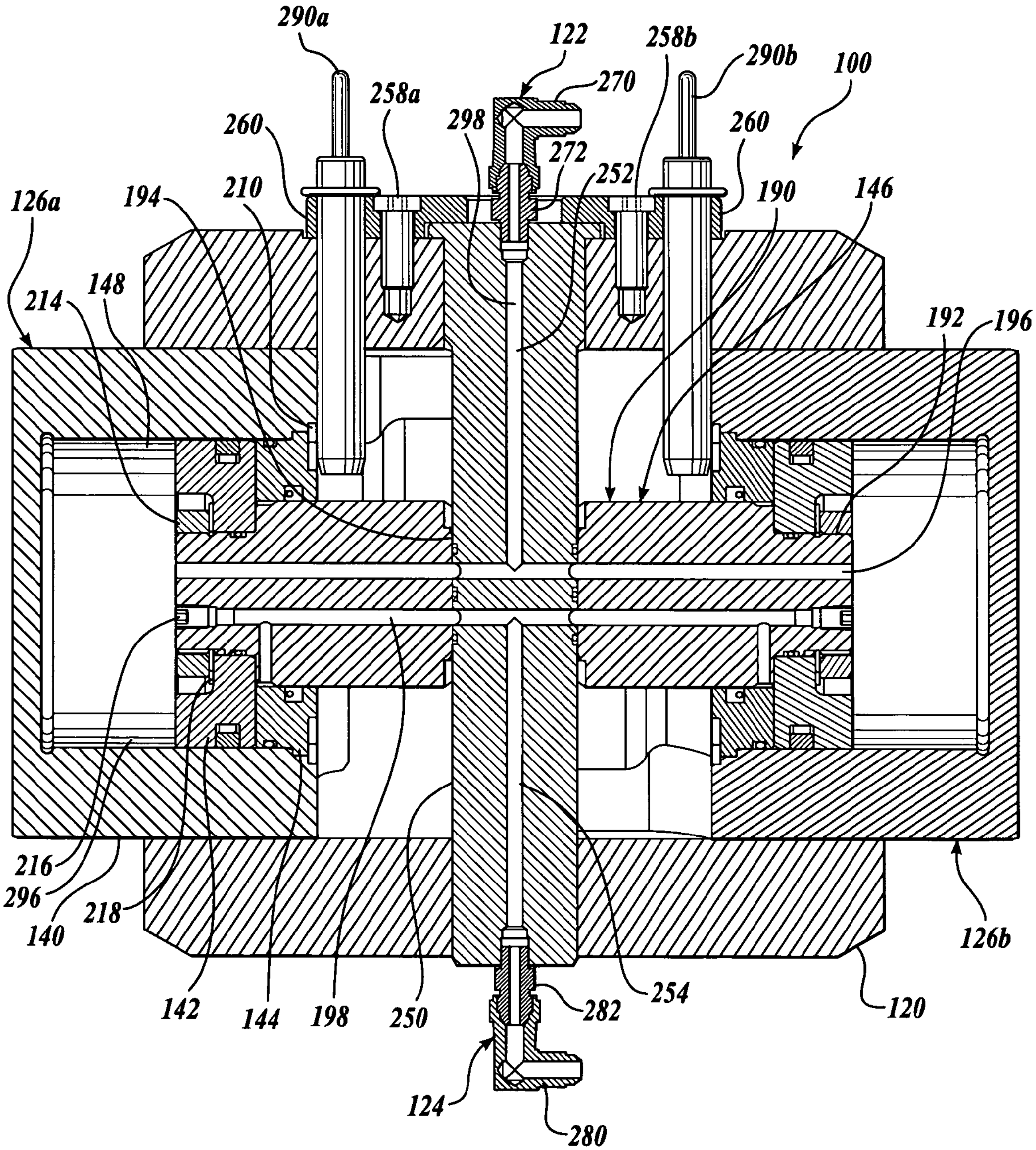
FIG. 5 is a cross-sectional, side planar view taken substantially through Section 5-5 of FIG. 3, and showing the lock assembly in a locked position.

The pin connection shaft 146 may be best understood by referring to FIG. 5. The pin connection shaft 146 is suitably a rod-shaped member having a major diameter 190 spanning between a minor diameter 192 formed on the ends of the pin connection shaft 146. The pin connection shaft 146 also includes a bore 194 extending through the major diameter 190 of the pin connection shaft 146.

Extending through a longitudinal axis of the pin connection shaft 146 are first and second fluid flow channels 196 and 198. The first and second fluid flow channels 196 and 198 are in fluid communication with the bore 194 to permit selective actuation of the lock assembly 100 between locked and unlocked positions, as described in greater detail below.

Coupling of the pin assembly 126*a* to the pin connection shaft 146 may be best understood by reference to FIGS. 4 and 5. The end cap 144 is coupled to the pin connection shaft 146 by sliding the major diameter 190 of the pin connection shaft 190 through the mounting bore 172 of the end cap 144. The end cap 144 is retained the pin connection shaft 190 by a retaining ring 210. The end cap 144 is suitably manufactured from a high strength material such as steel. The retaining ring 210 retains the end cap 144 to the pin 140. However, the end cap 144 slides along the pin connection shaft 146 as the pin 140 is reciprocated between locked and unlocked positions. As such, and during use, the end cap 144 is permitted to slide along the pin connection shaft 146.

The piston 142 is lockingly received on the minor diameter 192 of the pin connection shaft 146 and is sealing coupled thereto by a plurality of well-known seals 210*a*-210*f*. The piston 142 is coupled to the pin connection shaft 146 by seating one end surface of the piston 142 against a step defined between the major and minor diameters 190 and 192 of the pin connection shaft 146. A lock nut 214 is reversibly received on one end of the minor diameter 192 of the pin connection shaft 146 to selectively couple the piston 142 on the pin connection shaft 146.

The lock nut 214 includes a plug 216 sized to be received within the second fluid flow channel 198 of the pin connection shaft 146 to seal one end of the second fluid flow channel 198. A well-known lock washer 218 assists in lockingly retaining the lock nut 214.

As configured, the piston 142 remains selectively fixedly attached to the pin connection shaft 146 and the end cap 144 is permitted to slidingly reciprocate along the major diameter 190 of the pin connection shaft 146 during operation of the lock assembly 100.

The extension assembly 122 and retraction assembly 124 may be best understood by continuing reference to FIGS. 4 and 5. The extension and retraction assemblies 122 and 124 are coupled to the lock assembly 100 by a feeding shaft 250. The feeding shaft 250 is suitably a cylindrical member and includes an extension channel 252 and a retraction channel 254. The extension and retraction channels 252 and 254 extend substantially through a longitudinal direction of the feeding shaft 250. The extension channel 252 extends from one end of the feeding shaft 250 and the retraction channel 254 extends from a second end of the feeding shaft 250 in a converging manner.

The extension channel 252 is T-shaped in configuration, such that the extension channel 252 is in fluid communication with the first fluid flow channel 196 of the pin connection shaft 146. Similarly, the retraction channel 154 is also T-shaped and is in fluid communication with the second fluid flow channel 198 of the pin connection shaft 146. The feeding shaft 250 is dimensioned to suitably fit into to the bore 194 of the pin connection shaft 146 and is sealed within the pin connection shaft 146 by a plurality of well-known ring seals 256*a*-256*c*. The feeding shaft 250 is retained within the lock assembly 100 by a plurality of fasteners 258*a* and 258*b* extending through a cover plate 260. located on one end of the housing 120

The extension assembly 122 includes an elbow fitting 270 coupled to one end of the feeding shaft 250 by a coupler 272. The retraction assembly 124 is identically configured and includes an elbow fitting 280 coupled to the opposite end of the feeding shaft 250 by a coupler 282. As attached to the feeding shaft 250, the extension assembly 122 is in fluid communication with the extension channel 252 and the retraction assembly 124 is in fluid communication with the retraction channel 254.

Operation of the lock assembly 100 may be best understood by referring to FIGS. 5-8. In FIG. 5, the lock assembly 100 is shown in a fully extended or locked position with a pair of arresting pins 290*a* and 290*b* providing supplemental locking restraint of the first and second pin assemblies 126*a* and 126*b* within the housing 120. The first and second arresting pins 290*a* and 290*b* are slidably received within correspondingly shaped openings 292 located and extending partially through the housing 120. As received within the bores 292*a* and 292*b*, the lower ends of the arresting pins 290*a* and 290*b* slidably engage a portion of the pin 140 to selectively restrain the pin 140 in the fully extended position.

When the lock assembly 100 is in the locked position (FIG. 5), the cavity 148 within the pin 140 is substantially filled with a fluid, such as hydraulic fluid. To translate to the lock assembly 100 into an unlocked position, the arresting pins 290*a* and 290*b* are withdrawn from the housing 120. A pump (not shown) is activated to force fluid from a reservoir (not shown) through the retraction assembly 124 and into the retraction channel 254.

Figure 6:
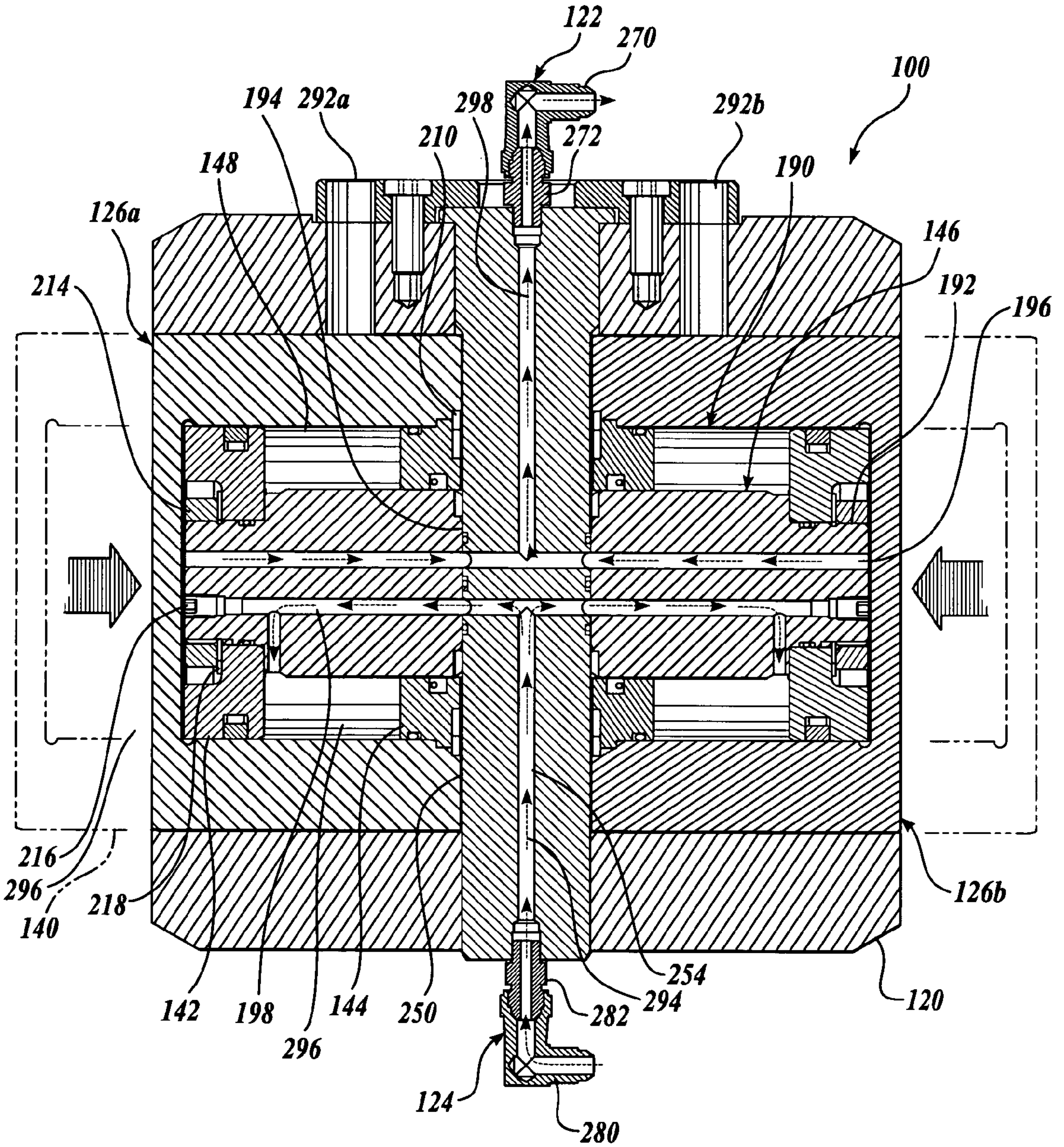
FIG. 6 is a cross-sectional, side planar view taken substantially through Section 5-5 of FIG. 3, and showing the lock assembly in an unlocked position.

As seen by referring to FIG. 6, fluid flows through the retraction channel 254 in the direction as indicated by the arrows 294. Because the retraction channel 254 is in fluid communication with the second fluid flow channel 198 of the pin connection shaft 146, fluid is diverted between the abutting surfaces of the piston 142 and end cap 144. Fluid pressure builds up, thereby creating a cavity 296 between the piston 142 and end cap 144. The fluid within the cavity 296 drives the end cap 144 along the major diameter 190 of the pin connection shaft 146.

As the end cap 144 is driven along the pin connection shaft 146 towards the feeding shaft 250, the pins 140 of the first and second pin assemblies 126*a* and 126*b* are retracted inwards within the housing 120. As noted above, the end cap 144 is selectively locked to the pins 140 by the retaining ring 210. As the end cap 144 is driven along the pin connection shaft 146, the correspondingly attached pins 140 are also driven along the pin connection shaft 146.

During the retraction actuation process, fluid within the cavity 148 is forced out of the cavity 148 through the retraction channel 254 of the feeding shaft 250. Because the retraction channel 254 and first fluid flow channel 196 are in fluid communication, fluid is forced through the first fluid flow channel 196 and out of the lock assembly 100 through the extension assembly 122 and into a hydraulic reservoir (not shown) connected to the free end of the elbow fitting 270. This fluid directional flow pattern is indicated by the arrows 298. Hydraulic fluid is pumped into the cavity 196 until the opposed end surfaces of the pins 140 are seated against the perimeter of the feeding shaft 250. After the pins 140 are fully retracted within the lock assembly housing 120, fluid is no longer pumped into the lock assembly 100.

Figure 7:
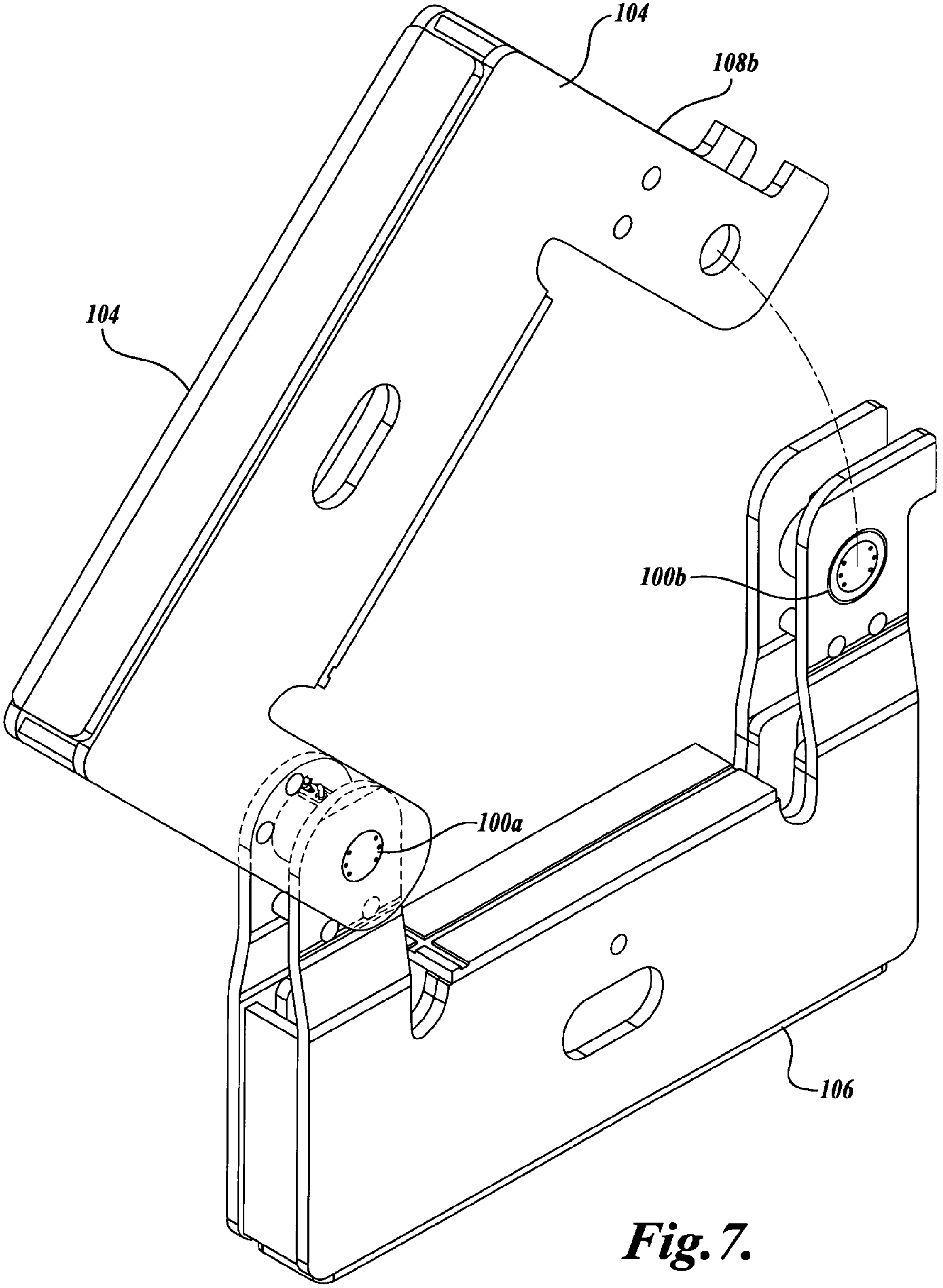
FIG. 7 is an isometric view of the frame of FIG. 2, and showing a first lock assembly in an unlocked position to permit pivoting of an upper frame member around a pivot defined by a second lock assembly shown in a locked position.

When the lock assembly 100 is in the unlocked position, and as may be best seen by referring to FIG. 7, the upper frame member 104 is permitted to pivot around the first lock assembly 100*a*. It should be apparent that both the first and second lock assemblies 100*a* and 100*b* may be retracted into the unlocked position, thereby permitting the upper frame member 104 to be completely removed from the lower frame member 106.

Figure 8:
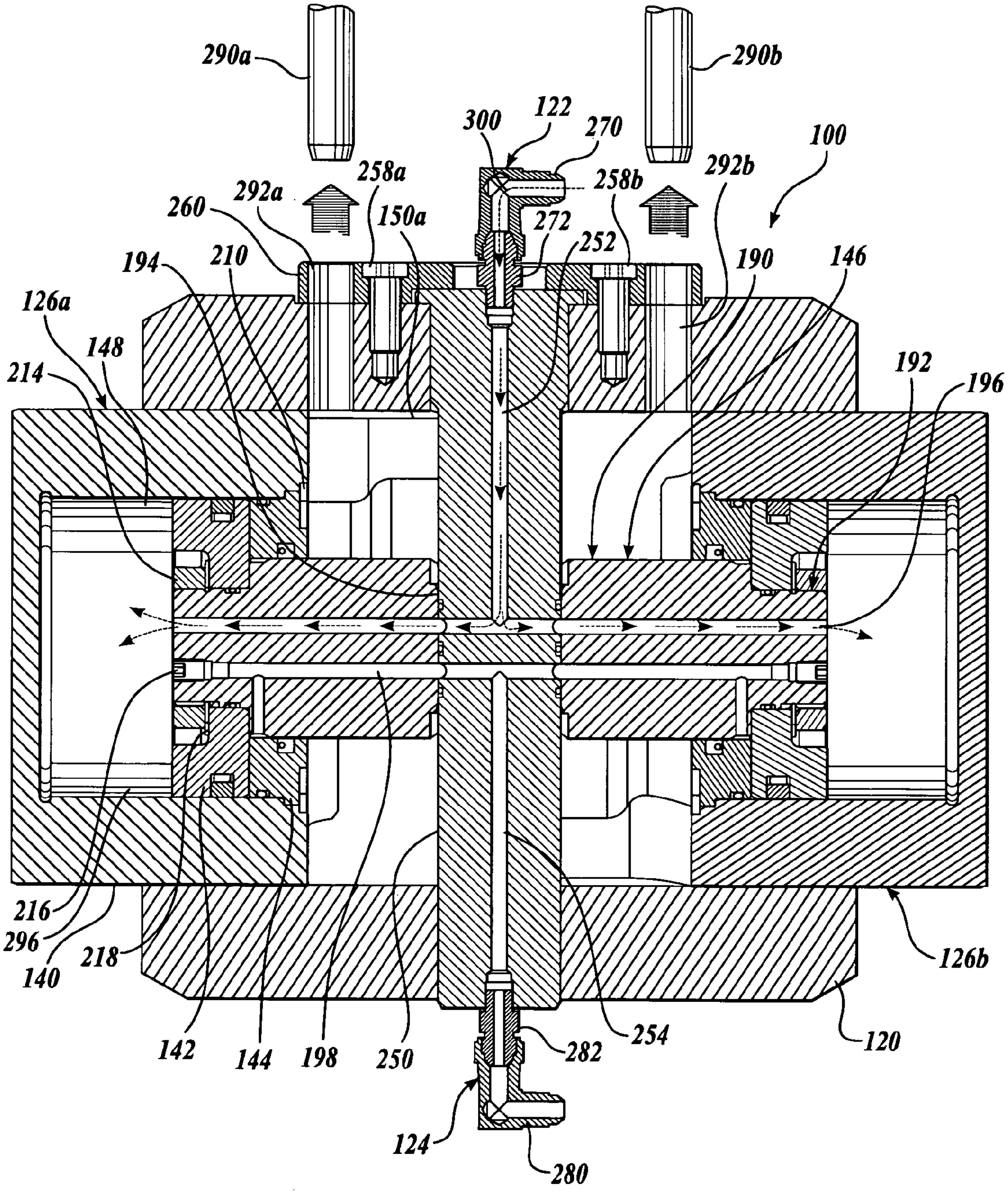
FIG. 8 is a cross-sectional, side planar view taken substantially through Section 5-5 of FIG. 3, and showing the lock assembly in an unlocked position and internal fluid flow.

Actuation of the lock assembly 100 into the locked position may be best understood by referring to FIG. 8. The pins 140 are driven from the unlocked position by pumping fluid into the elbow fitting 270 of the extensions assembly 122 in the direction indicated by the arrow 300. Fluid flows through the coupler 272 and into the extension channel 252 of the feeding shaft 250.

As the extension channel 252 and the first fluid flow channel 196 are in fluid communication with each other, fluid is driven out of the first fluid flow channel 196 of the pin connection shaft 146 and against the closed interior end of the pin 140. This fluid pumping action drives the pin 140 away from the ends of the pin connection shaft 146 to create the cavity 148. Fluid continues to fill the cavity 148, thereby driving the pin 140 outwardly until the end cap 144 abuts and is seated against a corresponding surface of the piston 142. Pumping of fluid into the extension assembly 122 is ceased and the arresting pins 290*a* and 290*b* are reinserted into their corresponding bores 292*a* and 292*b*.

As described, a locking assembly 100 constructed in accordance with various embodiments of the present disclosure provides a pin assembly disposed within the housing and selectively actuatable between a locked position (FIG. 8), wherein the pin 140 is displaced into engagement with upper and lower frame members, and an unlocked position (FIG. 6). This reciprocating action is accomplished, at least in part, by the unique combination of various components of the pin assemblies 126 and 126*b*, the pin connection shaft 146, and the feeding shaft 250 acting as a reciprocating assembly or as a driving assembly.

Although the presently described embodiments include first and second pin assemblies 126*a* and 126*b*, it should be apparent that other lock assemblies configured to include more or less pin assemblies are also within the scope of the present disclosure. As nonlimiting examples, such lock assemblies may include only a single pin assembly or any configuration of even or odd number of pin assemblies disposed within a housing. Accordingly, such lock assemblies, including more or less pin assemblies, are also within the scope of the present disclosure.

Although the subject matter has been described in language specific to structural features and/or methodical acts, the subject matter defined in the appended claims is not necessarily limited to the specific features or acts described above. Rather, the specific features and acts described above are disclosed as example forms of implementing the claimed embodiments. As such, various changes can be made to the described subject matter without departing from the spirit and scope of the disclosure. As a non-limiting example, although the actuation of the locking assembly has been described as pneumatically operated, other methods of actuation, such as hydraulic, mechanical, electro-mechanical, etc., are also within the scope of the present disclosure.

The embodiments of the invention in which an exclusive property or privilege is claimed are defined as follows:

1. In a manufactured wood products press of the type having a plurality of frames, at least one of the plurality of frames having first and second frame members, a lock assembly comprising:

(a) a housing;

(b) a pin assembly comprising:

a first pin;

and a second pin, the second pin being in fluid communication with the first pin for synchronous actuation with the first pin;

the pin assembly being disposed within the housing and selectively actuable between a locked positions where a first pin is displaced into engagement with a portion of the first and second frame members, and an unlocked positions (c) an extension assembly in fluid communication with the first pin to selectively actuate the first pin into the locked position;

(d) a retraction assembly in fluid communication with the first pin to selectively actuate the first pin into the unlocked position;

wherein the first and second pins are moved to the locked position by the extension assembly which selectively expands a first cavity within each of the first and second pin assemblies; and wherein the first and second pins are moved to the unlocked position by the retraction assembly which reverses flow to expand a second cavity within each of the first and second pin assemblies.

2. The lock assembly of claim 1, wherein the first and second pins are disposed within opposite sides of the housing, such that the first pin lockingly engages first leg portions of the first and second frame members and the second pin lockingly engages second leg portions of the first and second frame members when the pin assembly is in the locked position.

3. The lock assembly of claim 1, wherein the first pin includes an anchor portion disposed within the housing.

4. The lock assembly of claim 3, wherein the anchor portion is sized and configured to distribute shear load associated with the pin assembly while the first pin is deployed in the locked position.

5. The lock assembly of claim 1, wherein the extension assembly is placed into fluid communication with the first pin through a series of channels.

6. The lock assembly of claim 1, wherein the extension assembly actuates the first pin into the locked position by supplying a fluid to the housing and pneumatically driving the first pin into the locked position.

7. The lock assembly of claim 1, wherein the retraction assembly actuates the first pin into the unlocked position by supplying a fluid to the housing and driving the first pin into the unlocked position.

8. In a manufactured wood products press of the type having a plurality of frames, at least one of the plurality of frames having first and second frame members, a lock assembly comprising:

(a) a housing;

(b) a pin assembly disposed within the housing; and (c) a reciprocating assembly coupled to the pin assembly;

wherein the reciprocating assembly selectively drives a first pin of the pin assembly to a locked position, where the first pin is deployed into locking engagement with portions of the first and second frame members, by selectively expanding a cavity within the pin assembly; and wherein the reciprocating assembly selectively drives the first pin to an unlocked position, where the first pin is actuated out of locking engagement with the first and second frame members by reversing flow within the reciprocating assembly to expand a second cavity within the first pin assembly.

9. The lock assembly of claim 8, wherein the reciprocating assembly pneumatically actuates the first pin between the locked and unlocked positions.

10. The lock assembly of claim 8, wherein the reciprocating assembly includes an extension assembly in fluid communication with the first pin to selectively supply a fluid to a portion of the first pin and drive the first pin into the locked position.

11. The lock assembly of claim 10, wherein the reciprocating assembly includes a retraction assembly in fluid communication with the first pin to selectively supply the fluid to a portion of the pin assembly and drive the first pin into the unlocked position.

12. The lock assembly of claim 11, wherein the first pin includes an anchor portion slidably disposed within the housing for distributing a shear load associated with the pin while the first pin is deployed in the locked position.

13. The lock assembly of claim 12, further comprising a second pin disposed within the housing, wherein the first and second pins are disposed within opposite sides of the housing, such that the first pin lockingly engages first leg portions of the first and second frame members and the second pin lockingly engages second leg portions of the first and second frame members when the pin assembly is in the locked position.

14. In a manufactured wood products press of the type having a plurality of frames, at least one of the plurality of frames having first and second frame members, a lock assembly comprising:

(a) a housing;

(b) first and second pin assemblies disposed in opposite ends of the housing; and (c) a driving assembly operatively coupled to the first and second pin assemblies to selectively reciprocate first and second pins of the first and second pin assemblies between a locked position, where the first and second pins are actuated into locking engagement with the first and second frame members by selectively expanding a cavity within each of the first and second pin assemblies, and an unlocked position, wherein the first and second pins are actuated out of locking engagement with the first and second frame members by reversing flow within the driving assembly to expand a second cavity within each of the first and second pin assemblies.

15. The lock assembly of claim 14, wherein the driving assembly includes an extension assembly in fluid communication with the first and second pins to selectively supply a fluid to a portion of the first and second pins and drive the first and second pins into the locked position.

16. The lock assembly of claim 15, wherein the driving assembly includes a retraction assembly in fluid communication with the first and second pins to selectively supply the fluid to a portion of the pin assembly and drive the first and second pins into the unlocked position.

17. The lock assembly of claim 16, wherein the first and second pins each include an anchor portion disposed within the housing to distribute shear load associated with the first and second pin assemblies while the first and second pins are displaced into the locked position.

* * * * *

UNITED STATES PATENT AND TRADEMARK OFFICE

CERTIFICATE OF CORRECTION

PATENT NO. : 7,575,034 B2
APPLICATION NO. : 11/313863
DATED : August 18, 2009
INVENTOR(S) : Kott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Seventh Day of September, 2010

David J. Kappos

*Director of the United States Patent and Trademark Office*